May 31, 1966      G. M. ZIVER      3,253,478

MECHANICAL MOVEMENT TRANSLATING DEVICE

Filed Feb. 13, 1964

INVENTOR.
GARO M. ZIVER

BY Sughrue, Rothwell, Mion, and Zinn

ATTORNEYS.

# United States Patent Office 3,253,478
Patented May 31, 1966

3,253,478
MECHANICAL MOVEMENT TRANSLATING
DEVICE
Garo M. Ziver, Corning, N.Y., assignor to Corning Glass
Works, Corning, N.Y., a corporation of New York
Filed Feb. 13, 1964, Ser. No. 344,749
7 Claims. (Cl. 74—424.8)

This invention relates to improvements in the art of mechanical movement translating devices. More particularly, this invention relates to a device for converting rotary movement to axial displacement at a mechanical advantage in either of two directions or in the same direction at two degrees of sensitivity.

In the control art of the type wherein a control shaft is rotated to accomplish some function such as switching or the like, there is need for a device for converting bidirectional rotary command movement of the control shaft or knob to unidirectional axial displacement with varying degrees of sensitivity or bidirectional axial displacements at composite mechanical advantage depending on the direction of rotation of the control knob or shaft within its rotational range relative to a set or detent position. It is an object of this invention to provide a simple inexpensive device for accomplishing the foregoing.

It is also desirable in a control shaft arrangement for converting rotary to axial motion to use a threaded motion transmitter to thereby produce a mechanical advantage. It is an object of this invention to provide such a device with a threaded motion transmitter in which a dual threaded nut is selectively locked either to the transmitting control shaft or to a stationary nut to thereby effect the movement translation depending on the hand and pitch of the threads of the nut.

Other objects of the invention will be pointed out in the following description and claims and illustrated in the accompanying drawing, which discloses, by way of example, the principle of the invention and the best mode which has been contemplated of applying that principle.

In general, this invention provides a mechanical movement translating device of the type having a control shaft to which an input rotary movement may be applied to produce an axial displacement of this control shaft by virture of its cooperation with a threaded member. The threaded member is usually a stationary nut and in this invention is a stationary internally threaded case. However, instead of the ordinary axial movement produced by the rotation of a screw within a stationary nut, the subject invention provides a dual or composite axial movement depending on the direction of rotation from a set position by virtue of a dual threaded nut interposed between the control shaft and the stationary casing and selectively locked to either the control shaft or the stationary case in accordance with the direction of rotation of the control shaft from the set or detent position. Therefore, depending upon the pitch and hand of the threads on the dual threaded nut cooperating with the control shaft and the stationary casing the control shaft will partake of unidirectional or bidirectional axial movement with different degrees of sensitivity.

Figure 2:
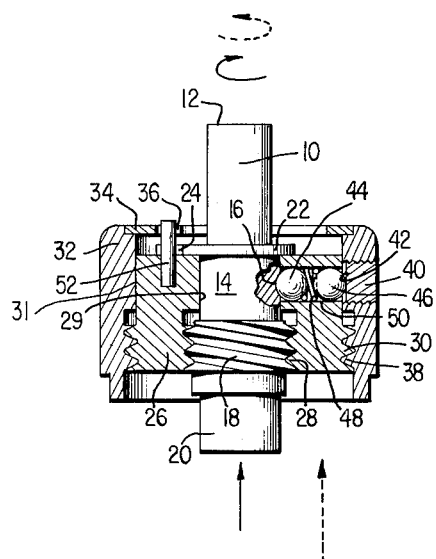
FIG. 2 is a vertical sectional view of the device with certain parts not shown in section for clarity of illustration.

Referring now particularly to the drawings, a control shaft 10 is shown with a control or input end 12 on which a knob or the like, not shown, may be suitably attached. The control shaft 10 includes a thickened central portion 14 having a detent recess 16 therein and having external threads 18 thereon. The lower end 20 of shaft 10 as shown in FIG. 2 is the working or output end of the shaft which partakes in an axial motion upon rotation of the input end 12 of the control shaft 10. The external threads 18 may be either left hand or right hand depending upon the use to which the invention is applied but in the embodiment illustrated they are left hand threads. There is also affixed to the control shaft 10 immediately above the thickened central portion 14 a collar 22 having an extending tab 24.

Immediately surrounding the control shaft 10 is a dual threaded nut 26 including internal threads 28 cooperating with threads 18 on the control shaft and the external threads 30. The dual threaded nut also includes a bearing portion 29 journalling the central portion 14 of the control shaft when there is relative rotation therebetween.

The dual threaded nut 26 is in turn surrounded by a stationary case 32. The stationary case 32 includes internal threads 38 cooperating with threads 30 which are the external threads on the dual threaded nut 26 and in the embodiment illustrated, right hand threads. Preferably the inner and outer threads 28 and 30 of the nut 26 and their cooperating threads are not only of a different hand but also of a different pitch. Above the threads 38 is a cylindrical bearing portion 31 inside the case for journaling the upper portion of dual threaded nut 26 when there is relative movement therebetween. The stationary case has affixed thereto a collar 34 with an inwardly extending tab 36. The tab 36 on collar 32 affixed to the case and the tab 24 on collar 22 affixed to control shaft 10 overlie one another in the set or detent position shown in FIG. 1. The stationary case 32 also includes a threaded insert 40 which has at its inner end a detent recess 42 at the same level as detent recess 16 in control shaft 10.

A differential locking means is provided for locking the dual threaded nut 26 to either the stationary case 32 or the control shaft 10 depending upon the direction of rotation of shaft 10 from the detent position. The differential locking arrangement of the preferred embodiment comprises a pair of spherical balls 44 and 46 positioned within a bore 50 in the dual threaded nut 26 and biased apart by means of a spring 48. The detent recesses 16 and 42 in the control shaft 10 and case 32 respectively serve as seats for the balls 44 and 46. The total length of the bore 50 is less than the total dimension of the fully compressed spring 48 and the diameter of the two balls. In this manner, one ball only is allowed to disengage from its corresponding detent recess at any one time. The condition of FIG. 1 and FIG. 2 with both balls in the detent recesses is the detent or set position.

The dual threaded nut 26 carries an upwardly extending stake 52 positioned a distance from the axis so that it will contact the tabs 36 and 24 affixed to the case 32 and shaft 10 respectively in the detent or set position illustrated. Thus, the relative rotation of the three parts, control shaft 10, dual threaded nut 26 and case 32 is limited depending on the contact of the stake 52 with the two tabs 36 and 24.

Figure 1:
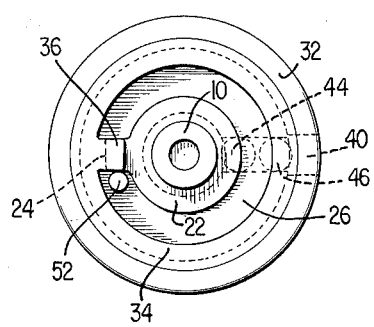
FIG. 1 is a top plan view of the mechanical movement translating device constituting the preferred embodiment of this invention.

The operation is best illustrated using a specific example. As illustrated, threads 18 and 28 between the control shaft 10 and nut 26 are left hand threads and threads 30 and 38 between nut 26 and case 32 are right hand threads of a different pitch. The stake 52 and tabs 24 and 36 affixed to shaft 10 and case 32 are positioned as shown in FIGS. 1 and 2 such that rotation of shaft 10 with respect to nut 26 is limited to clockwise from the detent position and rotation of the nut 26 with respect to the case 32 is limited to counterclockwise from the detent position.

Figure 3:
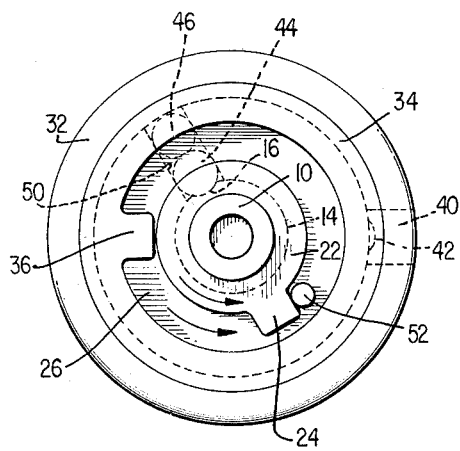
FIG. 3 is a top plan view which illustrates the device when rotated counterclockwise from the detent position of FIGS. 1 and 2.

When the control shaft is rotated in the counterclockwise direction from the detent position, FIG. 3, the control shaft tab 24 abuts the stake 52 and prevents relative rotary movement between shaft 10 and nut 26. On continued application of rotary force to control shaft 10, the ball 46 is forced out of detent 42 while the ball 44 is thereby locked in recess 16 and dual threaded nut 26 is locked to shaft 10. Thus, on continued counterclockwise rotary movement, the threads 30 and 38 provide the axial displacement and if they are right hand threads on rotary movement counterclockwise, the axial displacement will be up as viewed in FIG. 2.

Figure 4:
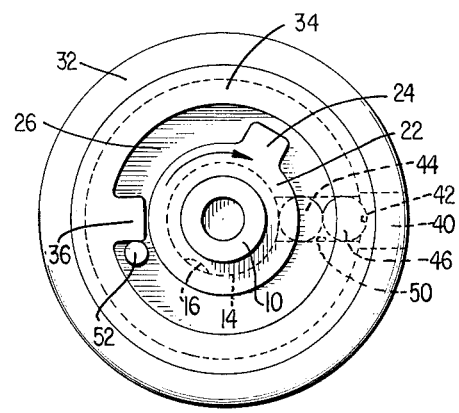
FIG. 4 is a top plan view which illustrates the device when rotated clockwise from the detent position.

Conversely, if the rotary movement is clockwise from the set or detent position, stake 52 abuts case tab 36 and on continued torque the inner ball 44 is forced out of its seat, see FIG. 4. With this movement, the dual threaded nut 26 is thereby locked by the differential lock to the case 32 and the axial movement of the working end 20 of shaft 10 is dependent upon the cooperating threads 18 and 28 on the control shaft 10 and dual threaded nut 26. If these threads are left hand, as in the illustration the end 20 will partake in an axial displacement in the same direction as before but at a different sensitivity due to a different pitch between the mating threads 18–28 and mating threads 30–38.

That is, by maintaining different pitches on the inner and outer threads of the dual threaded nut 26, different amounts of unidirectional axial displacement can be realized with the same degree of rotation of the control shaft 10 from the right or left of detent position. Using threads of the same hand for both the inner and outer threads on the dual threaded nut 26 but with different pitches, the axial displacement of control shaft working end 20 will be in opposite directions but at a different sensitivity. Therefore, the device of this invention creates two distinct axial movements depending upon the direction of rotation of the single control shaft.

The output end of the control shaft may have a cam or other output member attached thereto to effect separate mechanical functions depending upon the range of operation to either side of the detent position. One use of such an arrangement is to effect temperature control in its application to a creep type thermostat in an electrically powered kitchen appliance. However, the device may be useful in other and varied applications where it is necessary to accomplish different axial displacements at different degrees of sensitivity from a starting detent position from a single control shaft.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, the control shaft could be stationary and the outer case rotatable. It is the intention, therefore, to be limited only as indicated by the scope of the following claims.

What is claimed is:

1. In a mechanical movement translating device for obtaining an output with multiple mechanical effects from a single rotatable mechanical input comprising: a control shaft including external threads thereon; a dual threaded nut including internal threads cooperating with the threads on the control shaft and different external threads thereon; a stationary case housing the dual threaded nut and control shaft, the case including internal threads cooperating with the external threads of the nut; differential locking means between the control shaft, nut and case for selectively locking the nut to either the case or the control shaft and said differential locking means operable on rotating the shaft in a predetermined manner.

2. A device as defined in claim 1 wherein the internal and external threads on the dual threaded nut and their cooperating threads on the control shaft and stationary case respectively are of a different pitch and different hand.

3. A device as defined in claim 1 wherein the differential locking means includes a detent means providing a detent position for the control shaft, stationary case and dual threaded nut and means selectively operating the detent means depending upon direction of rotation of the control shaft.

4. A device as defined in claim 3 wherein the differential locking means and detent means comprises a pair of balls in a hole extending through the dual threaded nut, a spring between the balls and biasing them into recesses in the control shaft and stationary case, the length of the hole in the dual threaded nut and the dimension of the balls and fully compressed spring being such that the dual threaded nut may be locked to only one of the detent recesses in the control shaft and stationary case.

5. A device as defined in claim 3 wherein the means for selectively operating the detent means depending upon direction of rotation of the control shaft comprises a stop member extending from the dual threaded nut into the path of a pair of cooperating tabs rigidly attached to the stationary case and control shaft respectively.

6. In a mechanical movement translating device for obtaining an output with multiple mechanical effects from a single rotatable mechanical input comprising: a control shaft including external threads thereon; a dual threaded nut including internal threads cooperating with the threads on the control shaft and different pitch external threads thereon; a stationary case housing the dual threaded nut and control shaft, the case including internal threads cooperating with the external threads of the nut; a pair of balls in a hole extending through the dual threaded nut, a spring between the balls and biasing them into recesses in the control shaft and stationary case, the length of the hole and the dimension of the balls and fully compressed spring being such that the dual threaded nut may be locked to only one of the detent recesses in the control shaft and stationary case; and a stop member extending from the dual threaded nut into the path of cooperating tabs rigidly attached to the stationary case and control shaft respectively for limiting relative rotation between the nut and case to one hand and between the nut and shaft to the other hand from a detent position with the balls in the recesses.

7. In a mechanical movement translating device for obtaining an output with multiple mechanical effects from a single rotatable mechanical input comprising: three coaxial members, threadedly engaged one upon another, to provide an inner member and outer member threadedly connected to a middle member by threaded connections having different characteristics, one of the members other than the middle member being stationary, and the third member being rotatable to produce said mechanical translation effects, and differential locking means locking the middle member selectively to the stationary member or the rotatable member depending upon the direction of rotation of the rotatable member.

No references cited.

DAVID J. WILLIAMOWSKY, *Primary Examiner.*

L. H. GERIN, *Assistant Examiner.*